US012529136B2

(12) United States Patent
Sato et al.

(10) Patent No.: US 12,529,136 B2
(45) Date of Patent: Jan. 20, 2026

(54) METHOD AND APPARATUS FOR FORMING FILMS ON PARTICLES OF POWDER

(71) Applicant: Creative Coatings Co., Ltd., Tokyo (JP)

(72) Inventors: Eiji Sato, Tokyo (JP); Hitoshi Sakamoto, Nagaoka (JP)

(73) Assignee: Creative Coatings Co., Ltd., Tokyo (JP)

( * ) Notice: Subject to any disclaimer, the term of this patent is extended or adjusted under 35 U.S.C. 154(b) by 0 days.

(21) Appl. No.: 17/963,858

(22) Filed: Oct. 11, 2022

(65) Prior Publication Data

US 2023/0124553 A1    Apr. 20, 2023

(30) Foreign Application Priority Data

Oct. 14, 2021    (JP) .................................. 2021-168888

(51) Int. Cl.
*C23C 16/44*     (2006.01)
*C23C 16/455*    (2006.01)
*C23C 16/50*     (2006.01)

(52) U.S. Cl.
CPC .... *C23C 16/4417* (2013.01); *C23C 16/45502* (2013.01); *C23C 16/50* (2013.01)

(58) Field of Classification Search
None
See application file for complete search history.

(56) References Cited

U.S. PATENT DOCUMENTS

| 5,846,600 A | 12/1998 | Yamada et al. |
| 6,116,858 A | 9/2000 | Narabayashi |
| 7,216,006 B2 | 5/2007 | Yasui et al. |
| 11,345,994 B2 | 5/2022 | Sato et al. |

(Continued)

FOREIGN PATENT DOCUMENTS

| CN | 109554701 A1 | 4/2019 |
| JP | H07-054005 A | 2/1995 |

(Continued)

OTHER PUBLICATIONS

Machine Translation of JP 2013-122876 A (Year: 2013).*
Extended European Search Report, European Patent Office, application No. 222014995-1103, Feb. 15, 2023, 11 pages.

*Primary Examiner* — Shamim Ahmed
*Assistant Examiner* — Bradford M Gates
(74) *Attorney, Agent, or Firm* — Nolan Heimann LLP; David L. Hoffman

(57) ABSTRACT

A method for forming films on particles of powder includes diffusing the powder by leading the powder into a jet nozzle and ejecting a jet flow of the powder; leading the diffused particles of powder, a raw material gas, and a reaction gas activated by atmospheric pressure plasma, into a reaction container, and forming a swirl flow in the container; and forming the films on the diffused particles of powder by reaction of a raw material gas and an activated reaction gas in the container. An apparatus is also disclosed having a reaction container with a peripheral wall having a round section in plan view and a jet nozzle for a powder source, raw material gas, and atmospheric pressure plasma sources are coupled to and enter the container at an angle with a radius thereof thereby forming a swirl flow to form a film on the powder.

11 Claims, 5 Drawing Sheets

(56) References Cited

U.S. PATENT DOCUMENTS

| | | |
|---|---|---|
| 2013/0059079 A1 | 3/2013 | Yuasa |
| 2015/0125599 A1* | 5/2015 | Lindfors et al. |
| 2020/0240013 A1* | 7/2020 | Geertsen .................... B01J 2/16 |
| 2020/0385860 A1 | 12/2020 | Hirose et al. |
| 2021/0147979 A1 | 5/2021 | Sato et al. |

FOREIGN PATENT DOCUMENTS

| | | | |
|---|---|---|---|
| JP | H10-085634 A | | 4/1998 |
| JP | 2008-038218 A1 | | 2/2008 |
| JP | 2013122876 A | * | 6/2013 |
| JP | 2014-159623 A1 | | 9/2014 |
| JP | 5761724 B2 | | 6/2015 |
| JP | 2015-520297 | | 7/2015 |
| JP | 5927644 B2 | | 6/2016 |
| JP | 2017137550 A1 | | 8/2017 |
| JP | 6787621 B1 | | 11/2018 |
| WO | 2008018619 A1 | | 2/2008 |
| WO | 2013171360 A1 | | 11/2013 |
| WO | 2019098289 A1 | | 5/2019 |

\* cited by examiner

METHOD AND APPARATUS FOR FORMING FILMS ON PARTICLES OF POWDER

CROSS REFERENCE TO RELATED APPLICATION

This application is based upon and claims the benefit of priority to Japanese Patent Application No. 2021-168888 filed on Oct. 14, 2021, the entire contents of which are incorporated herein by reference.

BACKGROUND

The present disclosure relates to a method, apparatus, and the like for forming films on particles of powder.

A semiconductor manufacturing technique is used not only for film formation on a substrate but also for film formation on a surface of powder. In this case, particles of powder tend to condense. JP-A-2008-38218 discloses that films are formed on surfaces of carbon carriers by performing sputtering while agitating or rotating the carbon carriers in a vacuum container to disperse them.

JP-A-2014-159623 discloses a technique for coating surfaces of the powder by a dry process while rotating or swinging a cylindrical container arranged in a vacuum container relative to the vacuum container without rotating the vacuum container itself.

JP-B-6787621 filed by the present applicant discloses that a dispersion apparatus and a film forming apparatus that are capable of setting a common container in themselves are included and after the dispersion apparatus diffuses agglomerated particles of powder in the container by rotating or swinging, the film forming apparatus forms films on the diffused powder in the container.

According to JP-A-2008-38218 and JP-A-2014-159623, a powder dispersion operation by rotation or swing has to be simultaneously performed during a film formation operation on particles of powder. The rotational speed for dispersion performed simultaneously with film formation is limited and this causes insufficient dispersion especially of the powder on which films are formed without heating, due to a relatively low rotational speed. JP-B-6787621 does not have such an adverse effect; however, it is necessary to transfer the container from the dispersion apparatus to the film forming apparatus. Furthermore, any of JP-A-2008-38218, JP-A-2014-159623, and JP-B-6787621 has the problem of an increase in the size and complexity of an apparatus having a rotating or swinging mechanism. In JP-A-2008-38218 and the like, particles of powder are diffused by rotating a vacuum container or container that contains the particles of powder and this causes an increase in the size and complexity of an apparatus having a rotating or swinging mechanism. Furthermore, it is required to perform periodic maintenance of a worn-out part of the rotating or swinging mechanism. This leads an increase in the introduction cost and running cost of a film forming apparatus. Moreover, the powder diffusion effect due to rotation or swing is limited.

DESCRIPTION OF EXEMPLARY EMBODIMENTS

Figure 1:
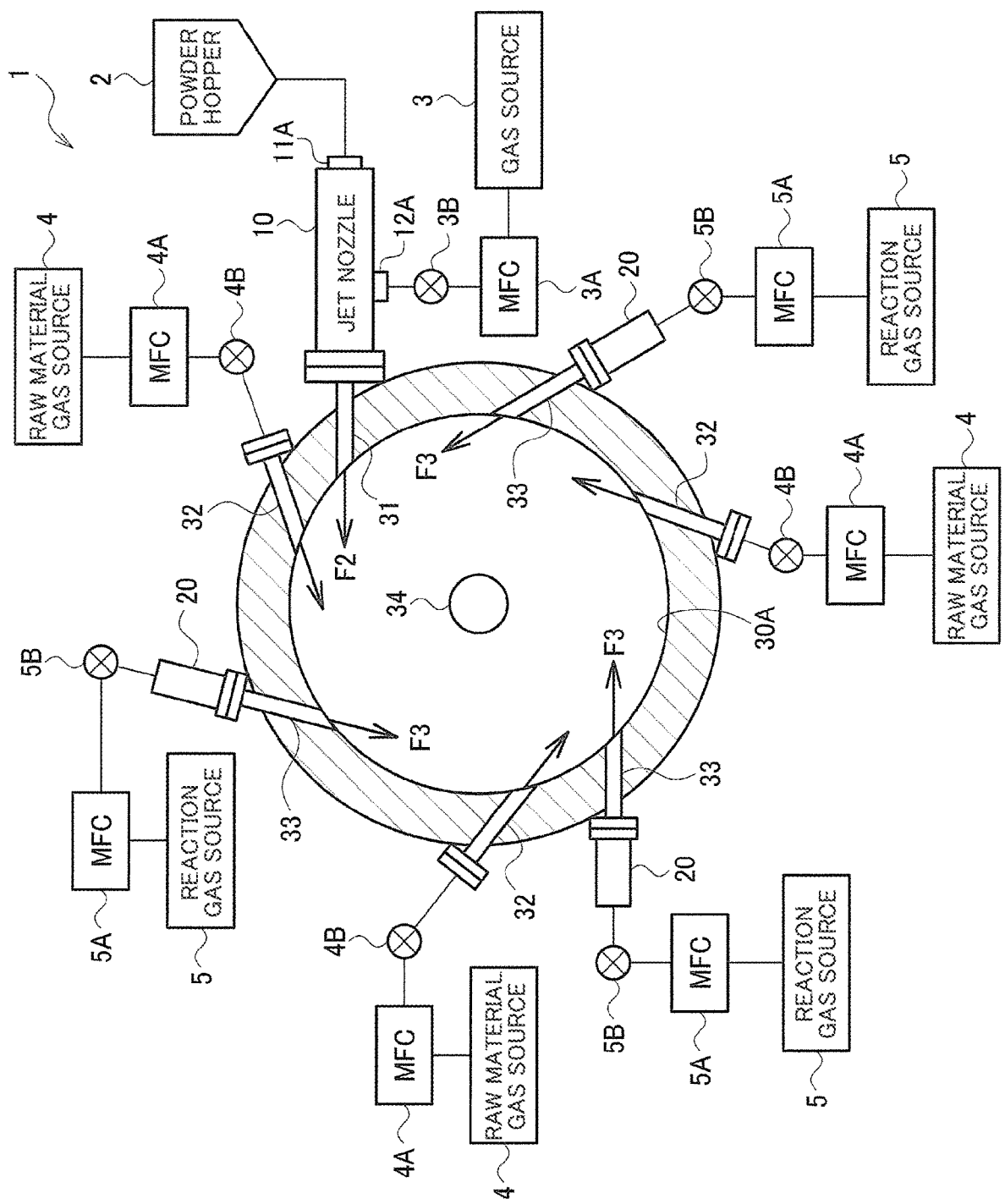
FIG. 1 is a view illustrating a film forming apparatus according to one embodiment of the disclosure.

The following disclosure provides different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments of relative movement in which at least one of the first element and the second element moves relative to the other.

It is an object of the present disclosure to provide a method and apparatus for forming films on particles of in which films are formed on the particles of powder that are reliably diffused without using a rotating or swinging mechanism.

It is another object of the present disclosure to provide a method and apparatus for forming films on particles of powder in which films are continuously formed on the particles of powder that are reliably diffused without using a rotating or swinging mechanism and are continuously supplied into a reaction container.

(1) An aspect of one of some embodiments relates to a method for forming films on particles of powder that includes: diffusing the particles of powder by leading the particles of powder into a jet nozzle and ejecting a jet flow of the particles of powder, and; and forming films on the diffused particles of powder by reaction of a raw material gas and a reaction gas activated by plasma, in a reaction container.

According to the aspect of one of some embodiments, a jet flow, preferably a supersonic jet flow, including particles of powder on which films are to be formed is generated. At the speed of the jet flow, a shock wave spreads out from a tip part of the powder; this allows particles of the condensed powder to be easily and reliably separated and diffused. Especially at a supersonic speed exceeding the speed of sound that is the maximum speed of vibration transmission through a medium, a great diffusion effect is obtained. The diffused particles of powder are led into the reaction container. In the reaction container, films are formed on surfaces of the diffused particles of powder by reaction of the reaction gas activated by plasm (active species, ions, or the like) and a raw material gas.

(2) In the aspect (1) of one of some embodiments, the film formation process may include causing the raw material gas and the reaction gas activated by atmospheric pressure plasma to react with each other in the reaction container. As the reaction gas is activated by the atmospheric pressure plasma, it is not necessary to evacuate the reaction container.

(3) In the aspect (2) of one of some embodiments, the method further includes: leading out an exhaust gas from the reaction container; and collecting film-formed powder separately from the exhaust gas. The gas in the reaction container is exhausted and the film-formed powder is collected, which allows the powder, raw material gas, and reaction gas to be continuously led into the reaction container and allows films to be sequentially formed on continuously led-in powder. This achieves an improvement in throughput. The film-formed powder is stored in a storage connected to the reaction container, for example. Alternatively, the film-formed powder may be brought back to a powder hopper so as to be supplied. This allows the film formation process to be repeatedly performed for the particles of powder. Here, when the same raw material gas is used in the repeated film formation process, the particles of powder can be laminated with layers of the same kind. Alternatively, when different raw material gases are used in the repeated film formation process, the particles of powder can be laminated with layers of different kinds of films.

(4) In the aspect (2) or (3) of one of some embodiments, the lead-in process may include causing each of the diffused particles of powder, the raw material gas, and the reaction gas activated by atmospheric pressure plasma to swirl or turn around in the reaction container. This allows the reaction of the raw material gas and the reaction gas, and film formation on the particles of powder to be efficiently performed in a swirl flow. The swirl flow may be a spiral downward flow toward an exhaust port disposed on a bottom of the reaction container or may be a spiral upward flow toward an exhaust port disposed on a top of the reaction container.

(5) Another aspect of one of some embodiments relates to an apparatus for forming films on particles of powder that includes: a jet nozzle that ejects a jet flow of led-in powder and diffuses the particles of powder; and a reaction container for forming films on the diffused particles of powder by reaction of a raw material gas and a reaction gas activated by plasma.

According to the other aspect (5) of one of some embodiments, the apparatus for forming films on particles of powder including the jet nozzle and the reaction container can favorably implement the method for forming a film on particles of powder of the aspect (1) of one of some embodiments.

(6) In the other aspect (5) of one of some embodiments, the jet nozzle, a raw material gas source that supplies the raw material gas, and an atmospheric pressure plasma source that generates the reaction gas activated by atmospheric pressure plasma can be connected to the reaction container. This allows the aspect (2) of one of some embodiments to be favorably implemented.

(7) In the other aspect (6) of one of some embodiments, the apparatus may further include: an exhaust part that leads out an exhaust gas from the reaction container; and a collection part that collects film-formed powder separately from the exhaust gas. This allows the aspect (3) of one of some embodiments to be favorably implemented.

(8) In the other aspect (6) or (7) of one of some embodiments, the reaction container includes a peripheral wall having a circular-shaped cross section in plan view, and the jet nozzle, the raw material gas source, and the atmospheric pressure plasma source can cause the diffused particles of powder, the raw material gas, and the reaction gas activated by the atmospheric pressure plasma, respectively, to be led in from a direction intersecting with a radial direction of the reaction container at a fixed angle. This allows the aspect (4) of one of some embodiments to be favorably implemented.

1. Film Forming Apparatus

FIG. 1 illustrates a film forming apparatus 1 of this embodiment. The film forming apparatus 1 includes: at least one jet nozzle 10; at least one, for example three atmospheric pressure plasma sources 20; and a reaction container 30. The reaction container 30 may include: at least one powder lead-in port 31; at least one, for example three raw material gas lead-in ports 32; at least one, for example three atmospheric pressure plasma flow lead-in ports 33; and at least one exhaust and powder lead-out port 34. In this case, the raw material gas lead-in port 32 is connected with the raw material gas source 4 via a flow controller (MFC) 4A and a valve 4B. Here, the raw material gas source 4 may include an inert carrier gas in addition to a raw material gas. The jet nozzle 10 includes a powder lead-in port 11A and a gas lead-in port 12A. The powder lead-in port 11A is connected to a powder hopper 2 and particles of powder are led in therethrough. The gas lead-in port 12A is connected with, for example, a gas source 3 of inert Ar via a flow controller (MFC) 3A and a valve 3B. The gas source 3 may be as the raw material gas source 4. In this case, the raw material gas lead-in port 32 is not necessary. The jet nozzle 10 emits a two-phase flow (jet flow) including a gas (inert gas or raw material gas) and diffused particles of powder. The atmospheric pressure plasma source 20 generates an atmospheric pressure plasma flow including an activated reaction gas. The atmospheric pressure plasma source 20 has a reaction gas source 5 connected thereto via a flow controller (MFC) 5A and a valve 5B. Here, the reaction gas source 5 may include an inert carrier gas in addition to a reaction gas.

Figure 4:
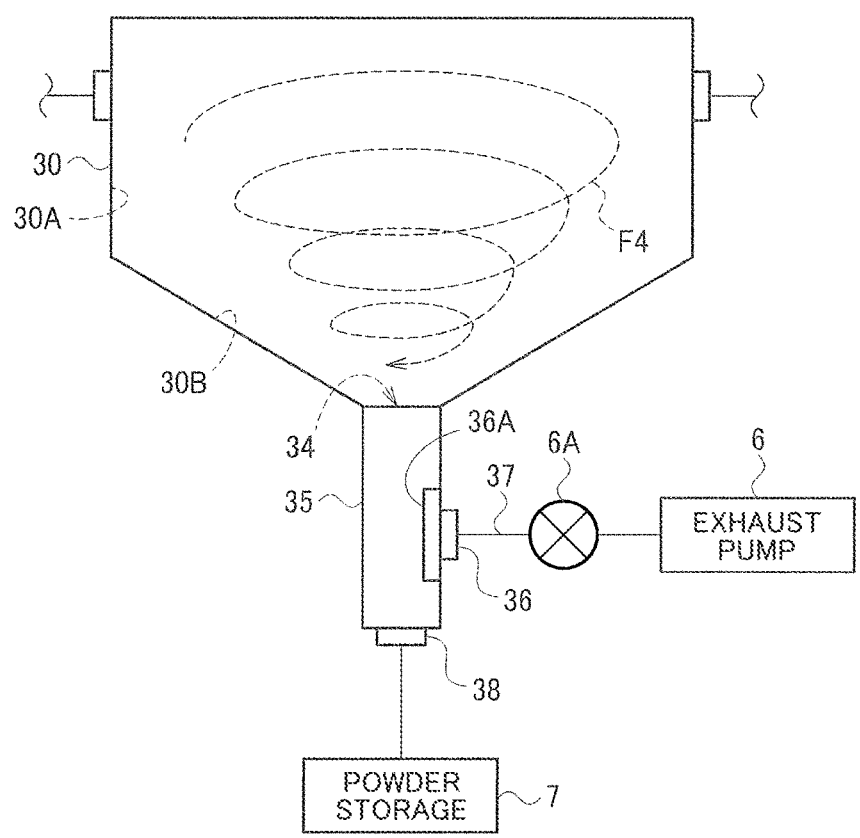
FIG. 4 is a view illustrating a structure of coupling to an exhaust and powder lead-out port illustrated in FIG. 1.

The particles of powder, the plasma flow from the plasma source, and the raw material gas are led into the reaction container 30, where films are formed on the particles of powder. The film-formed powder and the gas are discharged through the exhaust and powder lead-out port 34 that is disposed, for example, on a bottom of the reaction container 30. The gas in the reaction container 30 is exhausted, while the film-formed powder is stored (collected) in a powder storage (a collection part, in a broad sense) (FIG. 4).

2. Jet Nozzle

Figure 2:
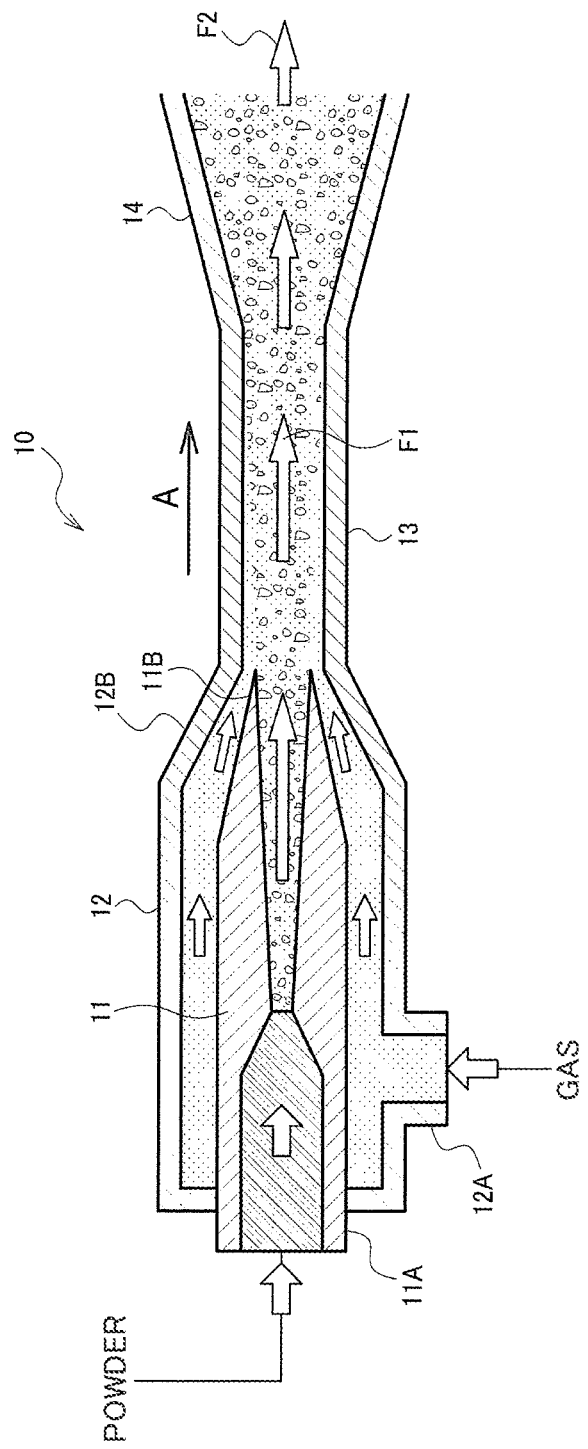
FIG. 2 is a schematic cross-sectional view of a jet nozzle illustrated in FIG. 1.

FIG. 2 is a schematic cross-sectional view of a jet nozzle 10 illustrated in FIG. 1. The jet nozzle 10 generates a supersonic jet flow F1 including the particles of powder and the reaction gas; and ejects a two-phase flow F2 that causes the particles of powder to be diffused at a supersonic speed.

The jet nozzle 10 may include, for example, a powder nozzle 11, a gas nozzle 12, and a mixing duct 13, as illustrated in FIG. 2. The powder nozzle 11 includes, in a first direction A, a powder lead-in port 11A at its upstream end and a powder lead-out port 11B at its downstream end. The gas nozzle 12 is arranged around the powder nozzle 11, for example, and a gas passage is formed between an inner wall of the gas nozzle 12 and an outer wall of the powder nozzle 11. The gas nozzle 12 includes, for example, a gas lead-in port 12A on a peripheral wall and a gas lead-out port 12B at a downstream end in the first direction A. The peripheral wall of the gas lead-out port 12B is tapered toward the downstream in the first direction A.

In this embodiment, the gas is pressure-fed, for example, from the inert gas source 3 through the flow controller 3A, the valve 3B, and the gas lead-in port 12A into the gas nozzle 12, as illustrated in FIG. 1. This gas passes through the tapered gas lead-out port 12B, thereby becoming supersonic. When the gas is ejected from the gas lead-out port 12B, a negative pressure is formed in the powder nozzle 11. This causes the powder to be sucked into the powder nozzle 11 from the powder hopper 2 through the powder lead-in port 11A.

In the mixing duct 13 where the particles of powder and the supersonic gas are mixed, the two-phase supersonic jet flow F1 including the particles of powder (solid phase) and the gas (gas phase) is generated. In the mixing duct 13, a shock wave spreads out from a tip part of each powder that is supersonic, which allows particles of the condensed particles of powder to be easily and reliably separated and diffused. It should be noted that the injector disclosed in JP-A-H10-85634, for example, ejects a two-phase supersonic jet flow including a liquid phase and a gas phase, not a two-phase supersonic jet flow including a solid phase (powder) and a gas phase (inert gas, for example).

In this embodiment, the jet nozzle 10 may have a diffuser 14 whose diameter increases toward the downstream in the first direction A, at the downstream end of the mixing duct 13. In the diffuser 14, speed energy can be converted into an emission pressure. At this time, a cavitation effect occurs in the diffuser 14, which can promote diffusion of the particles of powder. However, the jet nozzle 10 may eject the two-phase flow F2 as the supersonic jet flow F1 without the diffuser 14.

Thus, the two-phase flow F2 including the particles of powder having been diffused at a supersonic speed can be ejected from the mixing duct 13 or the diffuser 14 of the jet nozzle 10. In other words, the two-phase flow F2 including the particles of powder that are diffused without using a rotating or swinging mechanism and a gas that functions as a carrier gas can be generated.

3. Plasma Source

Figure 3:
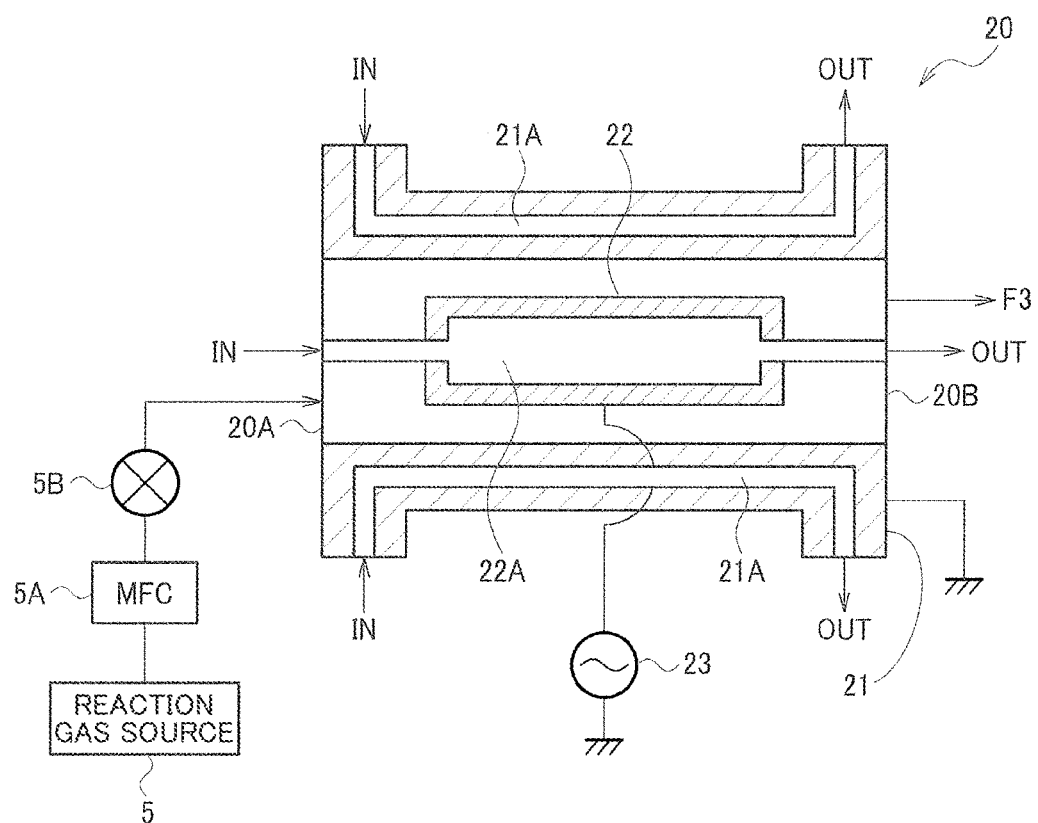
FIG. 3 is a schematic cross-sectional view of an atmospheric pressure plasma source illustrated in FIG. 1.

FIG. 3 is a schematic cross-sectional view of the atmospheric pressure plasma source 20 illustrated in FIG. 1. The atmospheric pressure plasma source 20 includes, for example, a grounded outer pipe 21 and a high-voltage electrode 22 that is arranged in the outer pipe 21. The high-voltage electrode 22 has a high-voltage AC power source 23 connected thereto. An inner surface of the outer pipe 21 and an outer surface of the high-voltage electrode 22 are coated by dielectric. A water passage 21A disposed in the outer pipe 21 and a water passage 22A disposed in the high-voltage electrode 22 may be supplied with a cooling water. A reaction gas lead-in port 20A of the outer pipe 21 has the reaction gas source 5 connected thereto via the flow controller (MFC) 5A and the valve 5B. An atmospheric pressure plasma flow lead-out port 20B of the outer pipe 21 is connected to an atmospheric pressure plasma flow lead-in port 33 of the reaction container 30. A high-voltage electric field is formed between the outer pipe 21 and the high-voltage electrode 22, where when a reaction gas is led in from the reaction gas source 5, the reaction gas is ionized to allow an atmospheric pressure plasma flow F3 to be generated. It is noted that the inner surface of the outer pipe 21 and the outer surface of the high-voltage electrode 22 are coated by dielectric.

4. Reaction Container

The two-phase flow F2 including particles of powder, the atmospheric pressure plasma flow F3, and a raw material gas are led to the reaction container 30. An activated reaction gas (ion, active species, or the like) in the atmospheric pressure plasma flow F3 reacts with the raw material gas. This reaction allows films to be formed on surfaces of the particles of powder diffused in the atmospheric pressure plasma flow F3. It should be noted that as described above, the two-phase flow F2 may be a two-phase flow including particles of powder and a raw material gas. In this case, it is not necessary to separately lead the raw material gas into the reaction container 30.

Here, the reaction container 30 may include a peripheral wall 30A having a circular-shaped cross section in plan view. The jet nozzle 10, the raw material gas source 4, and the atmospheric pressure plasma source 20 can cause the two-phase flow F2, the raw material gas, and the atmospheric pressure plasma flow F3, respectively, to be led in from a direction intersecting at a fixed angle with a radial direction of the reaction container 30. In other words, the powder lead-in port 31, the raw material gas lead-in port 32, and the atmospheric pressure plasma flow lead-in port 33 that are arranged in the reaction container 30 are formed along a direction intersecting at a fixed angle with the radial direction of the reaction container 30. The two-phase flow F2, the raw material gas, and the atmospheric pressure plasma flow F3 are led at a predetermined pressure, for example, a 0.2 Pa or higher pressure in the reaction container 30. This causes, as illustrated by a broken line in FIG. 4, in the reaction container 30, each of the diffused particles of powder, the raw material gas, and the reaction gas activated by the atmospheric pressure plasma to form a swirl flow (spiral downward flow) F4 that swirls along the peripheral wall 30A. This allows the reaction of the raw material gas and the reaction gas, and film formation on the particles of powder to be efficiently performed in the swirl flow F4.

The reaction container 30 may have, at a lower end of the peripheral wall 30A, a tapered wall 30B whose diameter decreases toward a lower portion thereof. This makes the swirl flow F4 a spiral downward flow as illustrated in FIG. 4. This allows the reaction of the raw material gas and the reaction gas, and the film formation on the particles of powder to be efficiently performed in the spiral downward flow F4. With the exhaust and powder lead-out port 34 on a bottom of the tapered wall 30B, the film-formed powder is led out together with an exhaust gas to outside of the reaction container 30. It should be noted that the peripheral wall 30A and tapered wall 30B of the reaction container 30 can be coated with a liner of ceramic or the like.

The gas in the reaction container 30 can be exhausted during film formation. The two-phase flow F2, the raw material gas, and the atmospheric pressure plasma flow F3 are led at, for example, a 0.2 Pa or higher pressure in the reaction container 30; and therefore, an exhaust gas in the reaction container 30 can be exhausted even without an exhaust pump 6. This allows the atmospheric pressure plasma flow F3 and the raw material gas to be continuously led into the reaction container 30, enabling films to be formed on particles of powder that are continuously supplied to the reaction container 30. The film-formed powder is collected into a powder storage 7 due to their own weights. When the exhaust gas in the reaction container 30 is forcibly exhausted to an exhaust pipe 37 through the exhaust pump 6, the particles of powder and the exhaust gas are easily separated from each other.

The exhaust and powder lead-out port 34, which is disposed on a bottom, for example, of the reaction container 30, has an exhaust and powder lead-out pipe 35 coupled thereto, as illustrated in FIG. 4. The exhaust and powder lead-out pipe 35 is coupled to the exhaust pipe 37 via the exhaust port 36. The exhaust port 36 is connected to the exhaust pipe 37. The exhaust pipe 37 is coupled to the exhaust pump 6 via a valve 6A, for exhaustion. The exhaust port 36 may have, for example, a filter 36A that allows gas to pass therethrough without allowing particles of powder to pass. The particles of powder that are prevented from passing through the exhaust pipe 37 by the filter 36A fall down through the exhaust and powder lead-out pipe 35, thereby being stored in the powder storage 7 via a powder lead-out port 38. A mechanism for cleaning the filter 36A may be arranged to prevent exhaustion efficiency from being deteriorated due to clogging of meshes of the filter 36A with the particles of powder.

Figure 5:
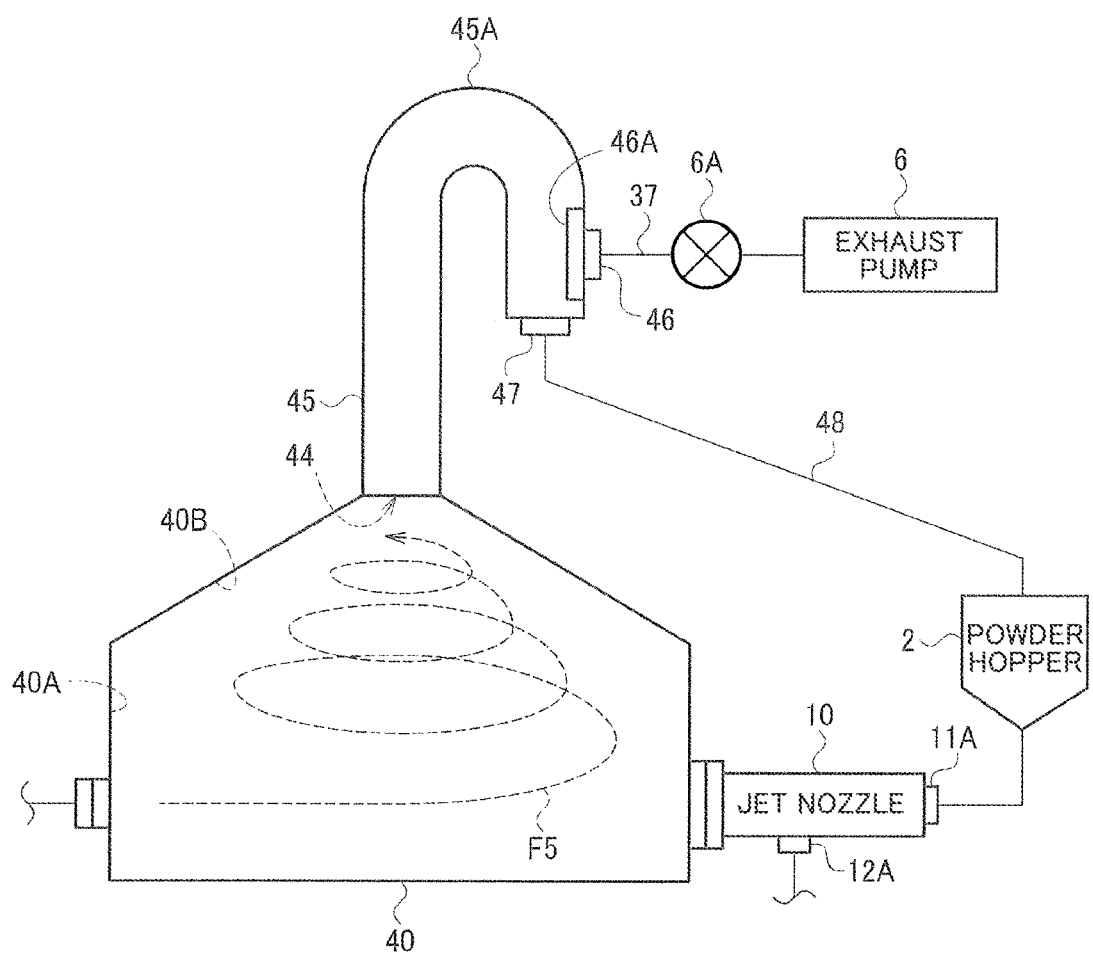
FIG. 5 is a view illustrating a modification of the structure of coupling to the exhaust and powder lead-out port.

FIG. 5 illustrates a modification, which is different from the illustration in FIG. 4. A reaction container 40 illustrated in FIG. 5 may have, at an upper end of a peripheral wall 40A, a tapered wall 40B whose diameter decreases toward an upper portion thereof. This makes a swirl flow F5 a spiral upward flow as illustrated in FIG. 5. This allows the reaction of the raw material gas and the reaction gas, and film formation on the particles of powder to be efficiently performed in the spiral upward flow F5. With an exhaust and powder lead-out port 44 on a top of the tapered wall 40B, the film-formed powder is led out together with an exhaust gas to outside of the container 40. It should be noted that the peripheral wall 40A and tapered wall 40B of the reaction container 40 can also be coated with a liner of ceramic or the like.

Also in this case, the gas in the reaction container 40 can be exhausted during film formation. The two-phase flow F2, the raw material gas, and the atmospheric pressure plasma flow F3 are led at, for example, a 0.2 Pa or higher pressure in the reaction container 40; and therefore, the exhaust gas in the reaction container 40 can be exhausted even without the exhaust pump 6. This allows the atmospheric pressure plasma flow F3 and the raw material gas to be continuously led into the reaction container 40, enabling films to be formed on particles of powder that are continuously supplied to the reaction container 40.

The exhaust and powder lead-out port 44, which is disposed on a top of the reaction container 40, has an exhaust and powder lead-out pipe 45 coupled thereto, as illustrated in FIG. 5. The exhaust and powder lead-out pipe 45 may include an inverted U-shaped pipe 45A downstream. The exhaust and powder lead-out pipe 45 is coupled to the exhaust pipe 37 via the exhaust port 46. The exhaust port 46 is connected to the exhaust pipe 37. The exhaust pipe 37 is, when required, coupled to the exhaust pump 6 via a valve 6A, for exhaustion. The exhaust port 46 has a filter 46A. The particles of powder that are prevented from passing through the exhaust pipe 37 by the filter 46A fall down through the inverted U-shaped pipe of the exhaust and powder lead-out pipe 45, thereby being separated from exhaust. Also in this case, when the exhaust gas in the reaction container 40 is forcibly exhausted to the exhaust pipe 37 through the exhaust pump 6, the particles of powder and the exhaust gas are easily separated from each other.

A powder lead-out port 47 disposed at an outlet of the inverted U-shaped pipe 45A may be coupled to the powder storage (collection part, in a broad sense) 7 in FIG. 4 or be coupled to the powder hopper (collection part, in a broad sense) 2 via a shooter 48 as illustrated in FIG. 5. According to the example in FIG. 5, the film-coated powder can be supplied again from the powder hopper 2 to the reaction container 40, thereby allowing the film formation process to be performed for the powder a plurality of times.

Repetition of the film formation process for particles of powder using the same kind of film enables a thicker film formation. Alternatively, different kinds of films can also be laminated on particles of powder. In this case, for example, each different raw material gas can be contained in each of the raw material gas sources 4 connected to a plurality of, for example, the three raw material gas lead-in ports 32 illustrated in FIG. 1. A raw material gas to be supplied is changed for each film formation process or once every plurality of film formation processes, thereby enabling different kinds of films to be laminated on each of particles of powder.

5. Film Formation on Powder

Various kinds of films can be formed on particles of powder based on selection of a reaction gas and a raw material gas. For example, an oxide film can be formed on particles of powder. In this case, an oxidation gas is used as a reaction gas. An example of the oxidation gas is a mixed gas of a carrier gas, for example, argon Ar and water vapor. When this mixed gas is supplied to the atmospheric pressure plasma source 20, it causes $Ar+H_2O \rightarrow Ar^*+OH^*+H^*$, generating an OH radical ($OH^*$). Furthermore, for example, TMA ($Al(CH_3)_3$) as a raw material gas and, for example, Ar as a carrier gas are supplied. Then, TMA($Al(CH_3)_3$) reacts with the OH radical ($OH^*$), generating an oxidized aluminum $Al_2O_3$. This causes a surface of the powder to be covered with an oxide film.

A nitride film can be formed on powder. In this case, a nitriding gas $NH_3$ can be used as a reaction gas. When a nitriding gas $NH_3$ is supplied to the atmospheric pressure plasma source 20, an NH radical is generated. Furthermore, for example, when TDMAS ($SiH[N(CH_3)_2]_3$) is used as a raw material gas, an NH radical and TDMAS react, causing an SiN film to be formed on the powder. Alternatively, for example, when TDMAT ($Ti[N(CH_3)_2]_4$) is used as a raw material gas, an NH radical and TDMAT react, causing a TiN film to be formed on the powder.

A metal film can be formed on powder. In this case, for example, a halogen gas can be used as a reaction gas. When halogen is supplied to the atmospheric pressure plasma source 20, a Cl radical is generated, for example. Furthermore, when sublimed CuCl, for example, is used as a raw material gas, the reaction of $CuCl+Cl \rightarrow Cl+Cl_2 \uparrow$ occurs, causing a copper Cu film to be formed on the powder.

It should be noted that activation of a reaction gas may be performed in the reaction container 30. In addition, the atmospheric pressure plasma is not limited to one using a high-voltage electric field and may be, for example, one using radio frequencies or microwaves.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A method for forming films on particles of powder, comprising:
   providing a reaction container that includes a peripheral wall having a circular-shaped cross section in plan view, and includes a powder lead-in port, a raw material gas lead-in port and an atmospheric pressure plasma flow lead-in port that are formed in the reaction container along a direction intersecting at a fixed angle with a radial direction of the reaction container,
   accelerating a gas to supersonic speed to create a negative pressure, sucking in the particles of powder using the negative pressure generated by the supersonic speed, mixing the particles of powder and the supersonic gas inside a jet nozzle, ejecting a supersonic jet stream of the particles of powder and the gas from the jet nozzle, and diffusing the particles of powder using the supersonic jet stream, leading the diffused particles of powder, a raw material gas, and a reaction gas activated by atmospheric pressure plasma, into the reaction container via the powder lead-in port, the raw material gas lead-in port and the atmospheric pressure plasma flow lead-in port, and forming a swirl flow in the reaction container; and forming films on the diffused particles of powder by reaction of the raw material gas and the activated reaction gas in the reaction container.

2. The method for forming films on particles of powder according to claim 1, wherein the raw material gas and the reaction gas are in this order repeatedly and alternately led in from an upstream side of the swirl flow through the raw material gas lead-in port and the atmospheric pressure plasma flow lead-in port formed in the reaction container.

3. The method for forming films on particles of powder according to claim 1, further comprising:

leading out an exhaust gas from the reaction container; and collecting film-formed powder separately from the exhaust gas.

4. The method for forming films on particles of powder according to claim 2, further comprising:

leading out an exhaust gas from the reaction container; and collecting film-formed powder separately from the exhaust gas.

5. The method for forming a film on particles of powder according to claim 3, wherein the film-formed powder is collected in a hopper for leading the film-formed powder into the jet nozzle.

6. The method for forming films on particles of powder according to claim 4, wherein the film-formed powder is collected in a hopper for leading the film-formed powder into the jet nozzle.

7. The method for forming films on particles of powder according to claim 1, wherein a central axis of the circular peripheral wall of the reaction container is a vertical axis, and the swirl flow is a spiral downward flow toward an exhaust port disposed on a bottom of the reaction container or is a spiral upward flow toward an exhaust port disposed on a top of the reaction container.

8. An apparatus for forming films on particles of powder, comprising:

a jet nozzle that accelerates a gas to supersonic speed to create a negative pressure that sucks in the particles of powder, mixes the particles of powder and the supersonic gas inside a jet nozzle, ejects the supersonic jet stream of the particles of powder and the gas, and diffuses the particles of powder using the supersonic jet stream;

a raw material gas source that supplies a raw material gas;

an atmospheric pressure plasma source that generates a reaction gas activated by atmospheric pressure plasma;

a reaction container that includes a peripheral wall having a circular-shaped cross section in plan view, and includes a powder lead-in port, a raw material gas lead-in port and an atmospheric pressure plasma flow lead-in port that are arranged in the reaction container and are formed along a direction intersecting at a fixed angle with the radial direction of the reaction container, wherein the films are formed on diffused particles of powder by reaction of the raw material gas and the activated reaction gas in the reaction container, wherein the jet nozzle, the raw material gas source, and the atmospheric pressure plasma source cause the diffused particles of powder, the raw material gas, and the reaction gas activated by the atmospheric plasma, respectively, to be led in via the powder lead-in port, the raw material gas lead-in port and the atmospheric pressure plasma flow lead-in port, thereby forming a swirl flow in the reaction container.

9. The apparatus for forming films on particles of powder according to claim 8, wherein raw material gas lead-in port and the atmospheric pressure plasma flow lead-in port repeatedly and alternately lead the raw material gas and the activated reaction gas in this order to the reaction container from an upstream side of the swirl flow.

10. The apparatus for forming films on particles of powder according to claim 8, further comprising:

an exhaust part that leads out an exhaust gas from the reaction container; and a collection part that collects film-formed powder separately from the exhaust gas.

11. The apparatus for forming films on particles of powder according to claim 9, further comprising:

an exhaust part that leads out an exhaust gas from the reaction container; and a collection part that collects film-formed powder separately from the exhaust gas.

* * * * *